Feb. 5, 1957  A. BOUWERS  2,780,142
CYLINDRICALLY REFLECTING MIRROR-PRISM
ANAMORPHOTIC OPTICAL SYSTEM
Filed April 26, 1955  3 Sheets-Sheet 1

INVENTOR.
ALBERT BOUWERS
BY
Wenderoth, Lind & Ponack
ATTORNEYS

Feb. 5, 1957 A. BOUWERS 2,780,142
CYLINDRICALLY REFLECTING MIRROR-PRISM
ANAMORPHOTIC OPTICAL SYSTEM
Filed April 26, 1955 3 Sheets-Sheet 2

INVENTOR.
Albert Bouwers,
BY
Wenderoth, Lind & Ponack
ATTYS.

Feb. 5, 1957 A. BOUWERS 2,780,142
CYLINDRICALLY REFLECTING MIRROR-PRISM
ANAMORPHOTIC OPTICAL SYSTEM
Filed April 26, 1955 3 Sheets-Sheet 3

INVENTOR.
Albert Bouwers.
BY
Wenderoth, Lind & Ponack
ATTYS.

United States Patent Office 2,780,142
Patented Feb. 5, 1957

2,780,142

CYLINDRICALLY REFLECTING MIRROR-PRISM ANAMORPHOTIC OPTICAL SYSTEM

Albert Bouwers, The Hague, Netherlands, assignor to N. V. Optische Industrie "de Oude Delft," Delft, Netherlands Application April 26, 1955, Serial No. 504,036

Claims priority, application Netherlands May 6, 1954

5 Claims. (Cl. 88—57)

This invention relates to anamorphotic optical systems. Such systems have been previously constructed using cylindrical lenses or a combination of prisms.

An object of the present invention is to provide an anamorphotic optical system in which the anamorphotic effect is produced by means of two cylindrical reflecting surfaces. It has been proposed already in British Patent No. 354,843 to use a system of cylindrical mirrors. However, this system produces images afflicted with strong astigmatism, as the focal lines of the two mirrors are perpendicular to each other.

A further object of the invention is to provide an anamorphotic optical system which is free from distortion and has approximately direct vision, the shift of the optical axis being restricted to small values only.

The system according to the invention comprises one convex and one concave cylindrical mirror, the axes of which are substantially parallel, and furthermore two approximately similar prisms, which are put between the mirrors in such a way that two corresponding surfaces of the prisms are substantially parallel and adjacent one another. Furthermore the arrangement is such that each of said corresponding surfaces acts both as a totally reflecting and as a transmitting surface.

This may be explained in more detail on the basis of a few embodiments that are shown in the drawing.

Figure 4:
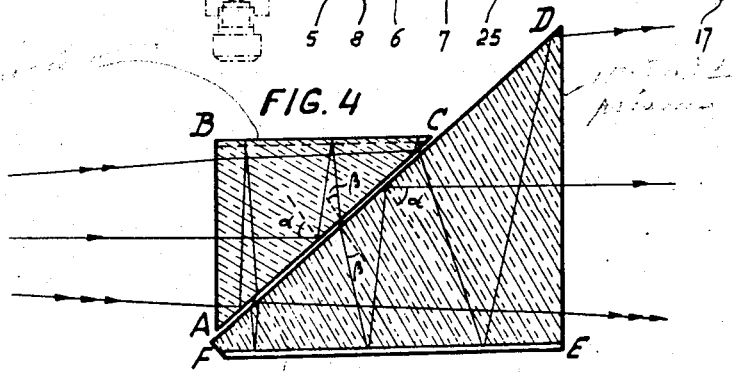

Fig. 4 gives a cross-section of the optical parts of an anamorphotic system as in the invention.

Figs. 5 to 11 inclusive show on a reduced scale an anamorphotic system as in the invention, with an anamorphotic factor of 2, and is suitable for filming and projecting of pictures on 35 mm. film.

Figure 5:
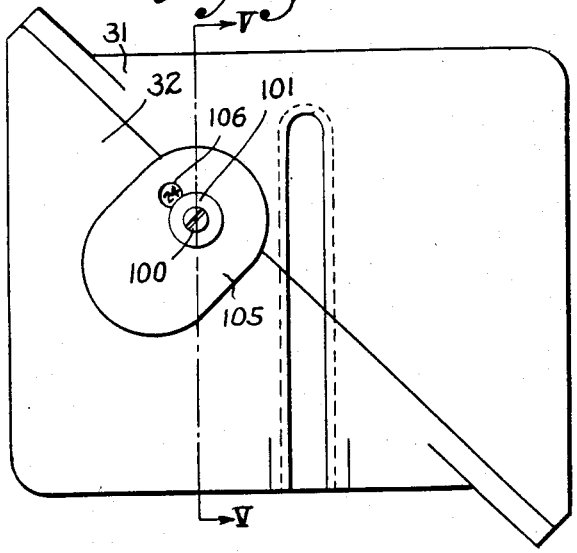

The figures respectively show the following:

Fig. 5 a side view.

Figure 6:
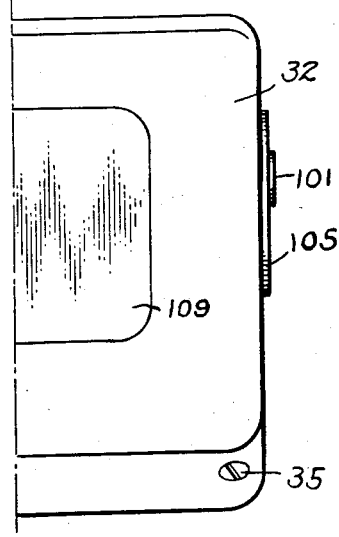

Fig. 6 a half rear view.

Figure 7:
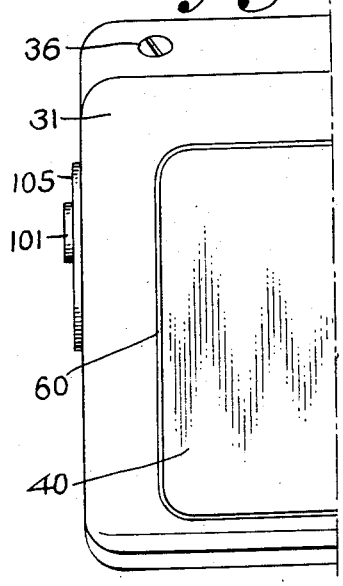

Fig. 7 a half front view.

Figure 8:
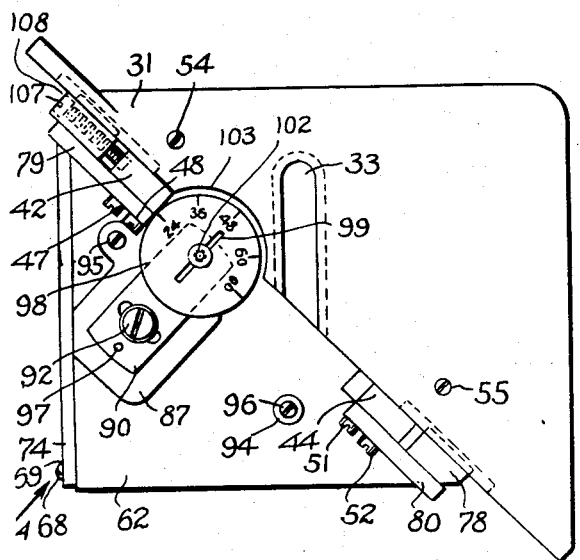

Fig. 8 a side view as in Fig. 5, but with hood removed.

Figure 9:
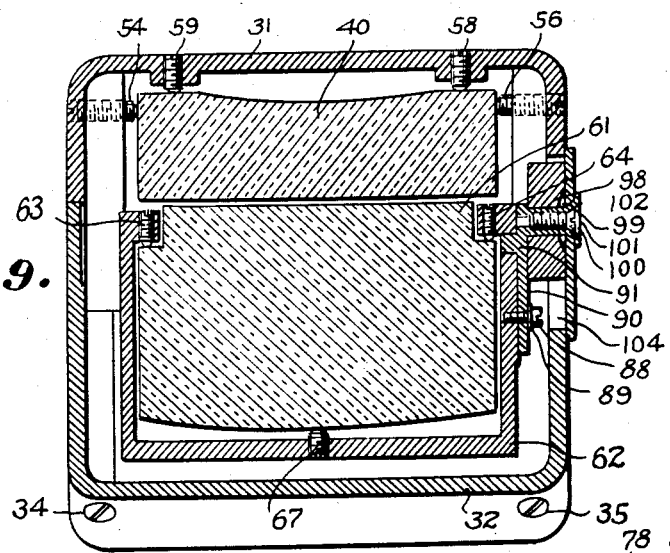

Fig. 9 a cross-section along line V—V of Fig. 5.

Figure 10:
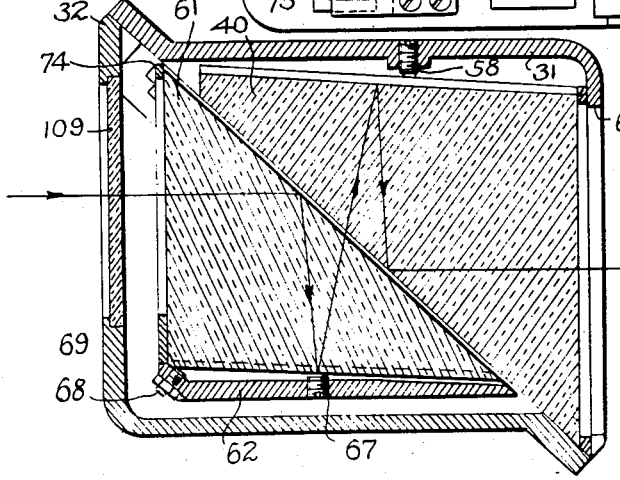

Fig. 10 a cross-section along the complete system; and

Figure 11:
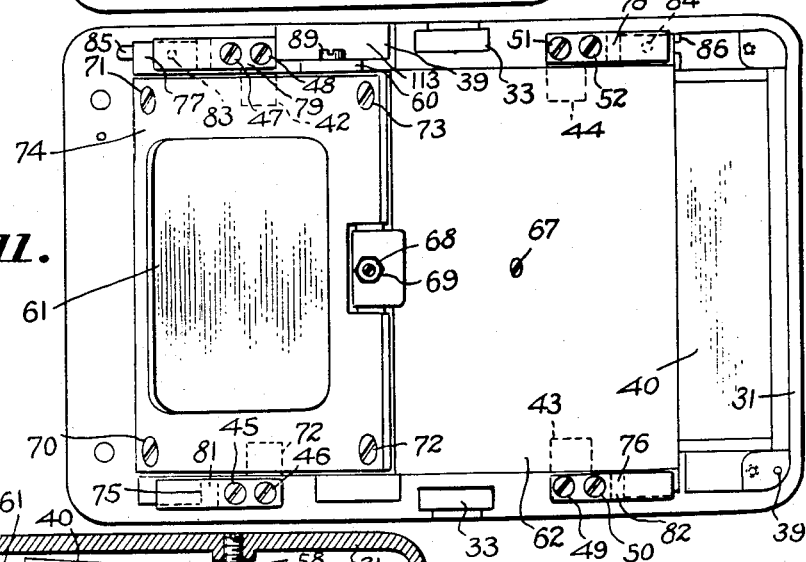

Fig. 11 a front view as indicated by the arrow A pointing towards Fig. 8.

The object and functioning of the system as in the invention are first described by reference to Fig. 4, after which the two embodiments of the invention are dealt with in accordance with the remaining figures.

Such a system, constructed for anamorphotic projection consists of the approximately similar prisms ABC and DEF.

The surface BC of the first prism is ground and polished convex cylindrical and thereafter mirrored, so that a concave cylindrical mirror is obtained, the radius of curvature being 332 mm. The surface EF of the second prism is ground and polished concave cylindrical and thereupon mirrored in order to obtain a cylindrical mirror with radius 166 mm. The axes of these two mirror surfaces are parallel to each other and also to the plane of the drawing and to the chief ray of the light beam which is incident from the left on the entrance surface AB of the first prism.

The angles A and D are 47°, the angles B and E 93.5° and the angles C and F 39.5°. The prisms are made of glass with refractive index 1.52, so that the critical angle of total reflection amounts to approximately 41°.

Following the chief ray of the beam incident on surface AB through the system, it is seen from the drawing that this chief ray passes surface AB perpendicularly and is incident on surface AC at an angle $\alpha = 47°$. This value is greater than that of the critical angle so that the ray is totally reflected. Thereupon the ray is reflected at the cylindrical mirrored surface BC and is incident for the second time on surface AC. The angle of incidence $\beta = 32°$ being now smaller than the critical angle, the ray is transmitted and enters the second prism through the surface DF. Herein the ray is first reflected at the cylindrical convex mirror EF and thereupon totally reflected at surface DF, the angle of incidence $\alpha = 47°$ being greater than the critical angle, and finally the ray emerges from the second prism through the surface DE.

The dimensions of both prisms are as follows:

Surface AB 80 x 80 mm.   Surface EF 125 x 95 mm.
Surface BC 90 x 80 mm.   Surface DE 108 x 95 mm.

The first-mentioned data refer invariably to the dimension of the surface involved in the plane of the drawing and the second to the dimension perpendicular thereto.

The distance between the mirrors BC and EF amounts to 83 mm., i. e. half the difference of the radii of these mirrors. Thus an incident parallel light beam will emerge from the system approximately parallel.

The anamorphic ratio obtained with the system amounts to the ratio of the radii of curvature of the convex and concave cylindrical mirror. Thus in this particular embodiment the anamorphic ratio amounts to 332/166=2.

The distance between the two mirrors is preferably adjustable, which can be done according to the invention in a simple way, by making the relative position of the prisms adjustable. This feature can serve both the purpose of adjustment and focusing. An advantageous device is that whereby one prism is shifted parallel to the surfaces AC and DF. Another favorable embodiment has the feature that one of the mirrors BC and EF is shifted in a direction which is perpendicular to their surfaces.

The embodiment of the invention just described is an anamorphotic system, which consists of only two optical elements with only two cylindrical and furthermore plane surfaces. Consequently manufacturing is simple. Furthermore the image quality is excellent and the distortion negligible, owing to the small angles of incidence of the light rays on both mirrors. Finally, the system has substantially direct vision.

The basic concept of the invention has been shown in connection with one particular embodiment, viz. the optics for an anamorphic system for a 35 mm. film, both for taking and projection purposes, Therefore in the embodiments described hereinafter the principle will not be explained once more but merely constructional details will be given.

Figures 1, 2:
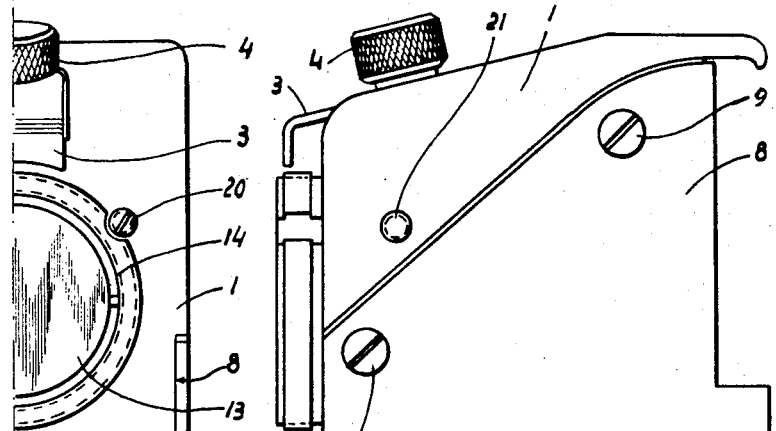
Fig. 1 is a side view.
Fig. 2 is a half rear view.
Figure 3:
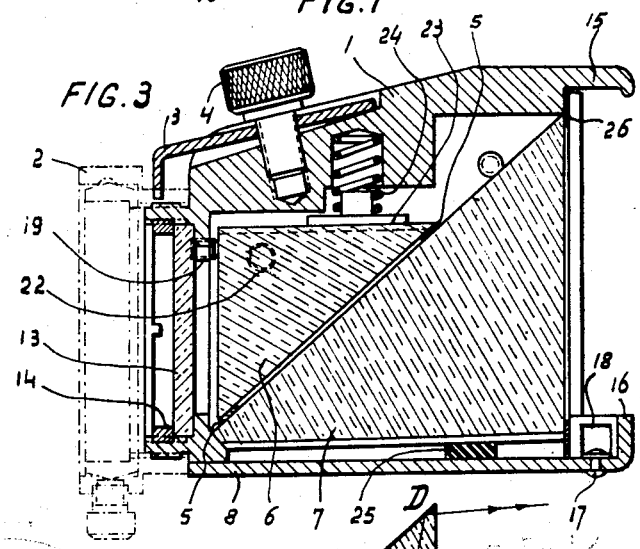
Fig. 3 is a cross-section of a complete anamorphotic accessory system as in the invention on an enlarged scale: the system has an anamorphotic factor of 1.5 and is suitable for filming as well as for projection of pictures on 8 mm. and 16 mm. film.

In Figs. 1, 2 and 3 is shown an embodiment of an anamorphic system with an anamorphotic factor of 1.5 whereby the housing 1 by means of a set of intermediate rings 2 (shown by dot-and-dash lines in Fig. 3), can readily be mounted on a film camera objective or projection lens (not visible in the drawing). The same system can be used both for 16 mm. film taking and projection by merely putting it either on a camera or a projector. The housing 1 is fixed on to the set of intermediate rings 2 by means of clamp 3 and knob 4. The prisms 6 and 7 are accommodated in the housing 1 with an intervening sheet of tin foil 5. The housing 1 is closed by a hood 8, by means of four screws 9, 10, 11 and 12 (the two latter are not visible) and by a plane-parallel glass cover 13 by means of a threaded ring. The front of the housing at 15 and of hood 8 at 16 is so constructed that the incorporation of interchangeable filters (not visible in the drawing) is possible, for which purpose a plate spring 18 is mounted in the hood 8 by means of one or more rivets. The prism 6 can be adjusted by means of the adjusting screws 19 and 20 and, in the side walls of the housing 1, by means of screws 21 and 22; prism 6 is furthermore held in position by these screws 19, 20, 21 and 22 and a pressure element 23 with spring 24. The prism 7 is held in position so that it fits between the side walls of the hood 8 with packing elements 25 and 26.

Prism 6 is provided with a concave cylindrical mirror and prism 7 with a convex cylindrical mirror with radii resp. 186.2 and 123. The distance between the two mirrors amounts to 31 mm. and the refractive index of the glass of both prisms is 1.517. Systems with identical construction but on a smaller scale can also be made for application to 8 mm. film taking and projection.

In Figs. 5 to 11 inclusive the same system as in Fig. 4 is represented however in its mounting. Thus prism 61 is identical with prism ABC and prism 40 with prism DEF in Fig. 4. 31 is the housing with hood 23 of an anamorphic system having an anamorphotic ratio of 1.5. It lends itself readily for mounting on a 35 mm. film projection apparatus (not shown in the drawing). For this purpose the housing 31 and hood 32 are fitted on both sides with a continuous groove 33. Hood 32 is fixed on to the housing by means of four screws 34, 35, 36 and 37 (the latter not visible in the drawing) and pins 38 and 39. In the hood a window 109 is fitted.

Incorporated in the housing is the prism 40, which bears upon the two pairs of blocks 41, 42 and 43, 44. These blocks are firmly fixed by means of screws 45, 46, 47, 48 and 49, 50, 51, 52 respectively. On the front, the prism 40 is in contact with the wall of window 60 of housing 31, with intervening packing 53. This prism 40 is adjusted in a sideway direction by means of two pairs of screws 54, 55 and 56, 57 (the latter not visible in the drawing), viz. in the side walls of the housing 1, the prism being held in position by means of the screws 58, 59.

A second prism 61 is incorporated in a prism stand 62, separated by a small space from prism 40. Prism 61 has a recess bordering the longer face of each of its two prism sides, and rests in this recess against two pairs of adjusting screws 63, 64 and 65, 66 (the latter pair not visible in the drawing), which are screwed into the wall of the prism stand 62 and by means of which the prism is adjusted with respect to prism 40. Prism 61 is adjusted in a sideway direction by means of the four adjusting screws, two of which (95, 96) are visible in the elevations 87 and 94 in Fig. 8.

The secure positioning of prism 61 in the stand 62 is ensured by means of screw 67 with locking nut 69. A diaphragm 74 for prism 61 is fitted to the stand 62 by means of screws 70, 71, 72 and 73. Inside the hood 32, the prism stand 62 with prism 61 is fitted in such a way that it can be slid in a lengthwise direction with respect to prism 40 in housing 41. For this purpose the stand 62 contains on either side two pairs of sliding cams 75, 76, and 77, 78, by means of which the stand can slide between the fixed guide blocks 79, 80, 81 and 82 fitted to the housing 31 by means of screws 45, 46, 47, 48, 49, 50, 51 and 52.

There are cylindrical pins 83, 84 fitted in the sliding cams 77, 78. Movement of the prism stand 62 is restricted by the above-mentioned guiding elements of the pins 83, 84 in the grooves 85, 86. The movement of stand 62 together with prism 61 serves for adjusting the distances at which projection is effected with the anamorphic system. When once the correct distance relating to the position of the screen has been adjusted it can only be altered by deliberate act. For this purpose the following simple means are provided. The stand 62 has a level-finished elevation 87 (Fig. 8). A bearing plate 90 with a cylindrical end 91 and an elongated slot 92 is adjustably cushioned in the wall of the stand 62 by means of a screw 88 with washer 89. After adjustment the bearing plate 90 is locked by a cylindrical pin 97 on the elevation 87 of the prism stand 62. For adjustment of the zero position an eccentric disk 98 with a saw-cut 99 is rotatably fitted on a shaft-end 102 on the bearing plate 90 by means of a screw 100 washer 101. The eccentric disk is provided with a graduated scale, which is indicated on the drawing with a range of adjustment from 24 m. to infinity. Lastly, the eccentric disk 98, which is situated in the recesses 103 and 104 of housing 31 and hood 32 respectively, is covered over by means of a plate 105 with window 106 (Fig. 5). The plate may be fixed, for instance by means of screws (not shown in the drawing).

The selected projection distance of the system is now determined by the position of prism 61 in the prism stand 62 with respect to prism 40 in housing 31. This position corresponds to that of the eccentric disk 98, which the stand 62 occupies in the guides 85, 86 with respect to the fixed block 42 (in housing 31). A spring 107 which is confined in the slide block 77 of stand 62 by means of screw 108 presses against the fixed block 42 of housing 31.

It is evident that the systems represented in the drawings show only some of many possible types, which are within the scope of the invention. For instance one or both of the mirrors can be made separately from the prisms and furthermore many geometrical forms can be designed for the prisms, whilst maintaining the basic and essential feature that between the parallel mirrors a surface or a set of two parallel surfaces is provided by which the active lightrays are first totally reflcted and thereupon transmitted, or reversely.

I claim:

1. An optical reflecting substantially direct vision anamorphosing device comprising a housing, a first and a second curved reflecting surface supported by said housing in operative alignment, having substantially parallel axes of generation, a pair of plane and substantially parallel reflecting surfaces interposed between and in angular relation to said first and second curved reflecting surfaces so that one of said plane reflecting surfaces totally reflects the rays before incidence on said first curved reflecting surface, then, after emergence from said first curved reflecting surface, the lightrays are transmitted subsequently by said pair of plane reflecting surfaces, are reflected at said second curved reflecting surface and finally are totally reflected at the other of said plane reflecting surfaces, one of said curved reflecting surfaces being convex and the other one concave and with their axes substantially parallel.

2. An optical system as set forth in claim 1, said first and second curved reflecting surface being cylindrical.

3. An optical system as set forth in claim 1, comprising two prisms with adjacent hypotenuse faces, which form together said pair of plane reflecting surfaces.

4. An optical system as set forth in claim 3, said first and second curved reflecting surface being each ground on a face of said prism.

5. An optical reflecting anamorphosing device as set forth in claim 4, means being provided by which said prisms can be shifted with respect to each other for the purpose of adjustment and focusing.

(References on following page)

References Cited in the file of this patent

UNITED STATES PATENTS

| | | |
|---|---|---|
| 1,525,658 | Roach | Feb. 10, 1925 |
| 1,669,027 | Seymour | May 8, 1928 |
| 1,898,787 | Newcomer | Feb. 21, 1933 |
| 2,317,988 | Forssberg | May 4, 1943 |
| 2,628,533 | Oetjen | Feb. 17, 1953 |
| 2,697,379 | Walker | Dec. 21, 1954 |

FOREIGN PATENTS

| | | |
|---|---|---|
| 8,512 | Great Britain | of 1898 |
| 354,843 | Great Britain | Aug. 17, 1931 |